(12) United States Patent
Sechler

(10) Patent No.: US 9,261,083 B2
(45) Date of Patent: Feb. 16, 2016

(54) FILTER AND RETAINER ASSEMBLY FOR PISTON PUMP

(75) Inventor: James Sechler, Farmington Hills, MI (US)

(73) Assignee: Kelsey-Hayes Company, Livonia, MI (US)

(*) Notice: Subject to any disclaimer, the term of this patent is extended or adjusted under 35 U.S.C. 154(b) by 901 days.

(21) Appl. No.: 13/232,638

(22) Filed: Sep. 14, 2011

(65) Prior Publication Data

US 2013/0064692 A1 Mar. 14, 2013

(51) Int. Cl.
*F04B 53/20* (2006.01)
*F04B 1/04* (2006.01)
*B60T 17/02* (2006.01)

(52) U.S. Cl.
CPC .............. *F04B 1/0421* (2013.01); *B60T 17/02* (2013.01); *F04B 1/0408* (2013.01); *F04B 53/20* (2013.01); *Y10T 29/49826* (2015.01)

(58) Field of Classification Search
CPC ...... F04B 53/20; F04B 1/0421; F04B 1/0408; F04B 9/00; F04B 9/02; F04B 9/042; F04B 9/045; B60T 17/02; Y10T 29/49826
USPC .......................................... 417/313, 470, 471
See application file for complete search history.

(56) References Cited

U.S. PATENT DOCUMENTS

| 4,998,461 | A | 3/1991 | Ishiwata et al. |
| 5,230,610 | A | 7/1993 | Reichenmiller |
| 5,320,498 | A | 6/1994 | Fuchida |
| 5,562,430 | A | 10/1996 | Schuller et al. |
| 5,601,345 | A | 2/1997 | Tackett |
| 5,688,113 | A | 11/1997 | Bareiss et al. |
| 5,897,303 | A | 4/1999 | Mueller |
| 5,953,916 | A | 9/1999 | Wurl et al. |
| 5,992,948 | A | 11/1999 | Gowda |
| 6,082,244 | A | 7/2000 | Siegel et al. |
| 6,199,962 | B1 | 3/2001 | Dokas et al. |
| 6,276,909 | B1 | 8/2001 | Siegel et al. |
| 6,283,733 | B1 | 9/2001 | Merklein et al. |
| 6,622,751 | B1 | 9/2003 | Beck et al. |
| 6,652,245 | B2 * | 11/2003 | Hauser et al. ................. 417/313 |

* cited by examiner

*Primary Examiner* — Charles Freay
*Assistant Examiner* — Philip Stimpert
(74) *Attorney, Agent, or Firm* — MacMillan, Sobanski & Todd, LLC

(57) ABSTRACT

A pump cartridge for use in a hydraulic braking system includes a sleeve having an outer surface and an inner bore. A piston has a first portion that is coaxially received within the sleeve inner bore. A second portion of the piston extends from the sleeve and is configured to reciprocate the piston first portion relative to the sleeve in response to rotation of an eccentric. A retainer engages the sleeve and is configured to maintain the first portion of the piston within the sleeve inner bore. A filter assembly is formed as a separate component and has a bore configured to permit the piston second portion to extend through the filter bore.

15 Claims, 5 Drawing Sheets

FILTER AND RETAINER ASSEMBLY FOR PISTON PUMP

BACKGROUND OF THE INVENTION

This invention relates in general to vehicular braking systems and, in particular, to hydraulic braking systems having pump-operated pressurizing systems.

Hydraulic braking systems, particularly for vehicular applications, can be equipped with pump and controller systems that dynamically vary the fluid pressure in response to sensor inputs. These sensor inputs provide information relating to the dynamic operating state of the vehicle, i.e., skidding conditions, tractive effort conditions, and steering reactions, to name a few. These braking systems, sometimes referred to as antilock braking systems (ABS), traction control systems (TCS), and electro-hydraulic braking systems (EHB), use a motor-driven pump to supply fluid pressure to a wheel-end brake mechanism. The fluid pressure is modulated by a valve circuit to provide proper distribution of braking effort to each wheel in response to a particular vehicle dynamic state.

The hydraulic pumps may be piston-type hydraulic pumps that supply fluid pressure through a piston that axially reciprocates within a cylinder bore. These piston pumps generally include a plurality of components, such as pistons, cylinders, bushings, springs, filters, and seals, for example, that are assembled into a pump housing. In order to minimize the package size of the pump assembly, the pump components are often unique to a particular pump size. This, in turn, raises part inventories and assembly costs. Additionally, the several components that make up the pump need to be retained during the assembly process into the pump housing. To help minimize costs, some components are integrated into a single part. However, this integration tends to limit material selection flexibility because the integrated components are often formed with the same or compatible materials, rather than using materials optimized for specific functions. Thus, it would be desirable to provide a pump assembly for a vehicular braking system that reduces packaging size at a lower assembly cost, yet retains a high degree of material selection flexibility.

SUMMARY OF THE INVENTION

This invention relates to a pump and, in particular, a pump for use in a hydraulic braking system. The pump may be configured as a piston pump that includes a sleeve having an outer surface and an inner bore. A piston has a first portion that is coaxially received within the sleeve inner bore. A second portion of the piston extends from the sleeve and is configured to reciprocate the piston first portion relative to the sleeve in response to rotation of an eccentric. A retainer engages the sleeve and is configured to maintain the first portion of the piston within the sleeve inner bore. A filter assembly having a bore is configured to permit the piston second portion to extend through the filter bore. A seal engages the piston second portion such that the filter is retained onto the piston second portion.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
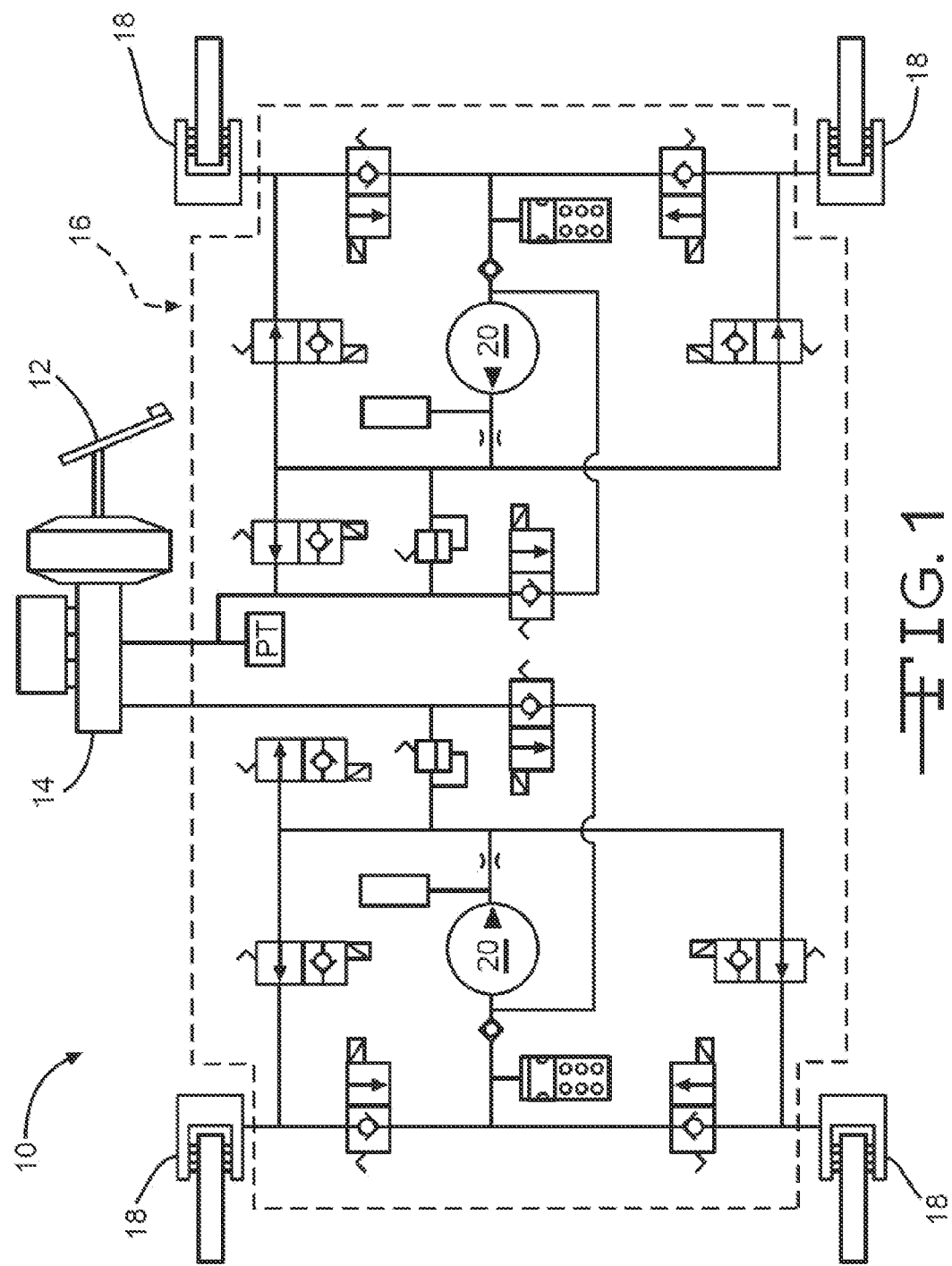
FIG. 1 is a schematic representation of a hydraulic brake system having a hydraulic pump assembly.
Figure 2:
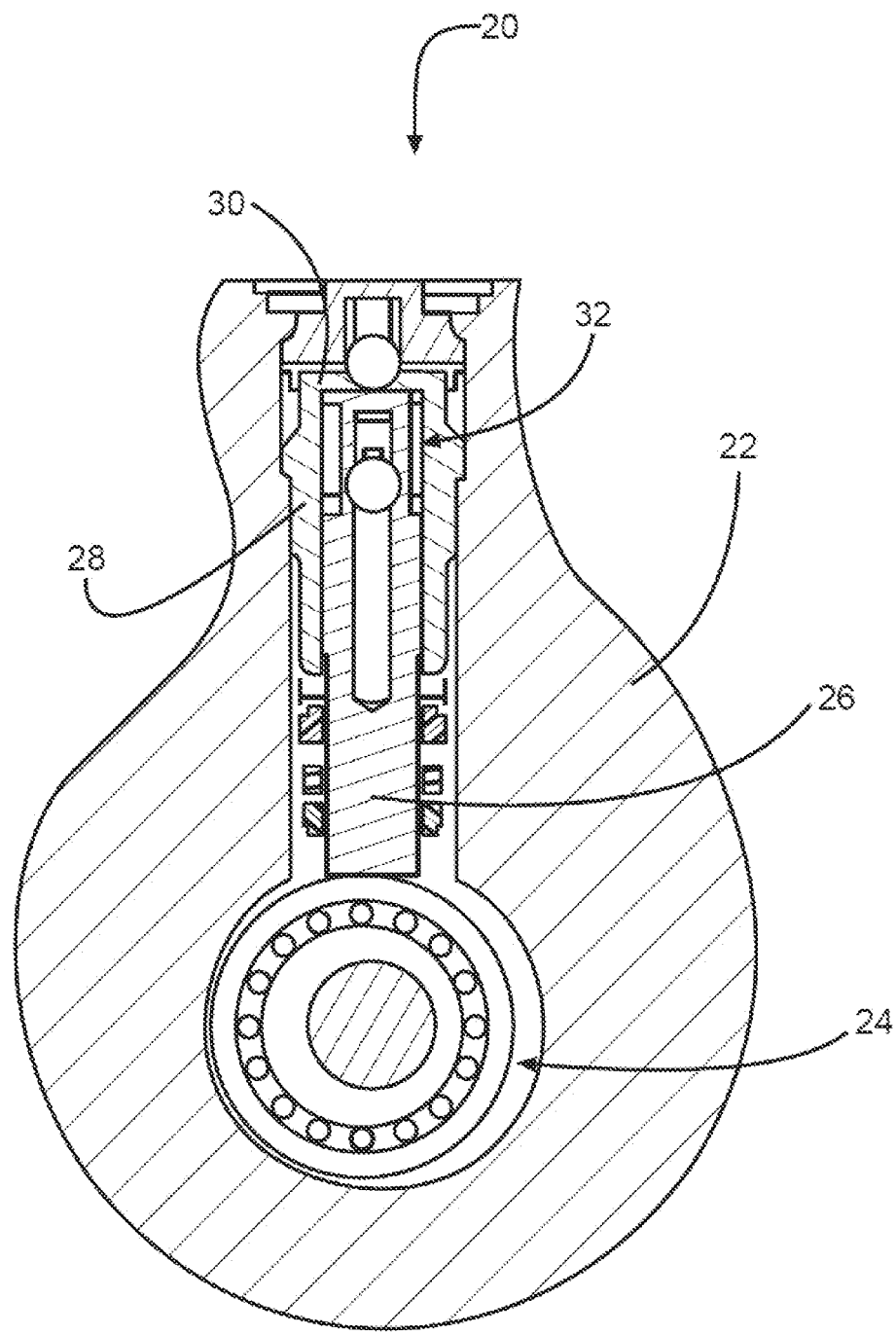
FIG. 2 is an enlarged, schematic cross sectional view of one of the hydraulic pumps of FIG. 1.

Referring now to the drawings, there is schematically illustrated in FIG. 1 a vehicular brake system, shown generally at 10. The vehicular brake system 10 includes a brake pedal 12 connected to a master cylinder 14. A hydraulic circuit, configured as a hydraulic control unit (HCU) shown generally at 16, is connected in fluid communication with the master cylinder 14 and a plurality of wheel brakes 18. The wheel brakes 18 are shown as disc brakes but may be any type of wheel brake. The illustrated HCU 16 includes two hydraulic pumps 20, each schematically illustrated as a reciprocating piston pump, as shown in FIG. 2. The pumps 20 pressurize and transfer fluid between the master cylinder 14 and the wheel brakes 18. The HCU 16 further includes various valves and other components that are in fluid communication with the pumps 20 for providing, for example, anti-lock braking, traction control, vehicle stability control, and dynamic rear brake proportioning functions. It should be understood that the HCU 16 may be configured other than as depicted and may include additional, fewer, or different components. The HCU components, however, may be configured in different fluid communication arrangements depending on the specified performance requirements and/or functions provided by the designated vehicular brake system.

Figure 3:
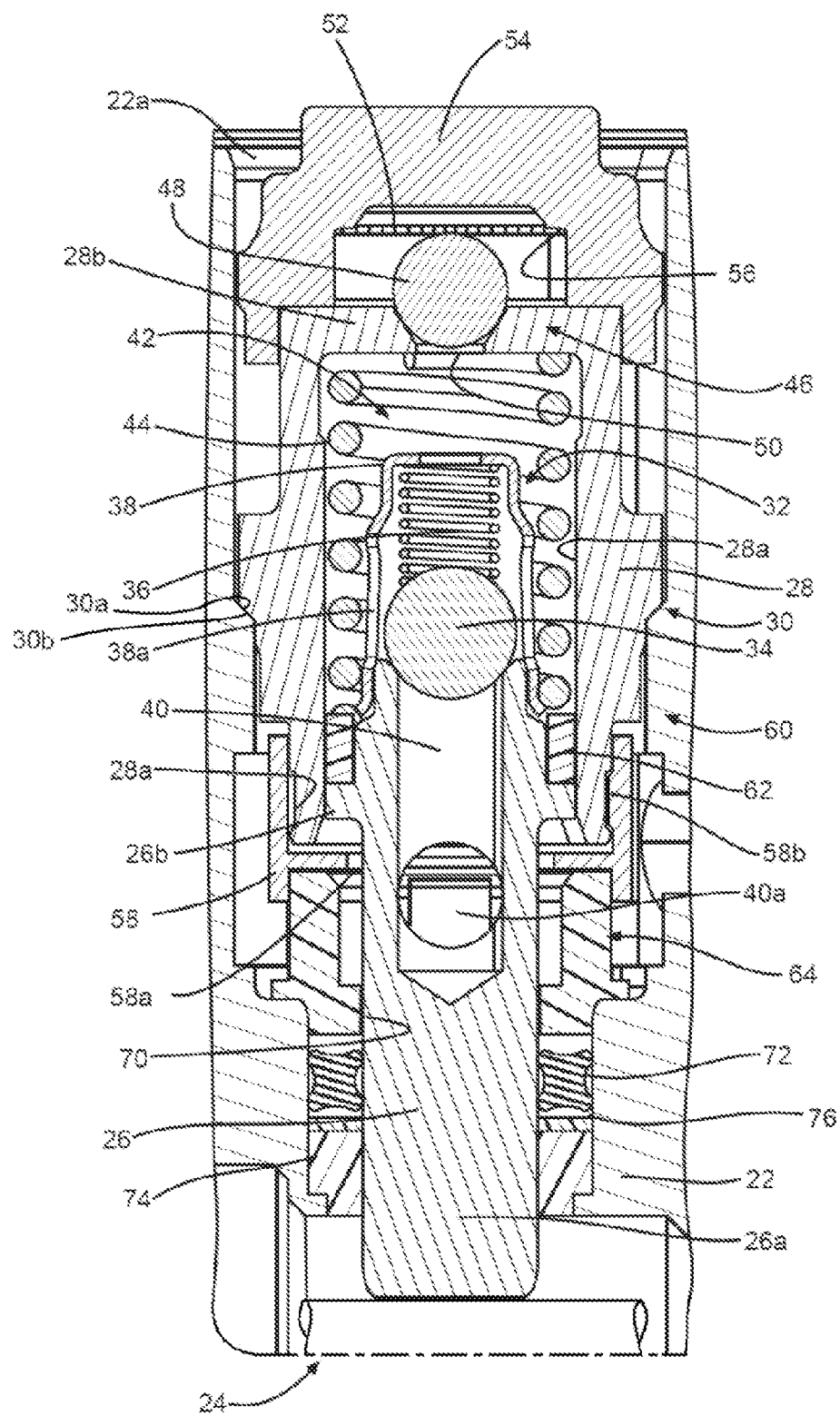
FIG. 3 is an enlarged cross sectional view of a portion of the hydraulic pump illustrated in FIG. 2.

Referring now to FIGS. 2 and 3, the pump 20 includes a housing 22 having a cylinder bore 22a, and a motor-driven eccentric, shown generally at 24. A piston 26 includes a first portion that is telescopically received within an inner bore 28a of a sleeve 28. The sleeve 28 also includes a sleeve end 28b. The sleeve 28, when disposed in the cylinder bore 22a of the housing 22, contacts a sleeve seat, shown generally at 30, which is illustrated as two mating surfaces. The mating surfaces include a first seat 30a formed in the cylinder bore 22a and a second seat 30b formed on the sleeve 22. The mating surfaces 30a and 30b forming the sleeve seat 30 are shown as contacting angled surfaces, though the sleeve seat 30 may be formed at any angle. The motor-driven eccentric 24 contacts a second portion of the piston 26 and, as the eccentric 24 rotates, causes the first portion of the piston 26 to reciprocate within the sleeve 28. Though shown as a single-piece piston, the first and second portions of the piston 26 may be separate components that are joined together, either by mechanical means or bonded by adhesives, welding, and the like. Fluid is admitted through an inlet valve, shown generally at 32. The inlet valve 32, as shown in FIG. 3, includes an inlet ball 34, an inlet biasing spring 36, and a retaining cage 38. The retaining cage 38 includes at least one aperture 38a that permits fluid flow between inlet and outlet passages. The inlet biasing spring 36 urges the inlet ball 34 against an end of an inlet passage 40 to form a fluid-tight seal. The inlet passage 40 includes an inlet aperture 40a that is in fluid communication with a fluid source (not shown). As the fluid overcomes the force of the biasing spring 36, the fluid is drawn past the inlet valve 32, through apertures 38a in the retaining cage 38, and into a chamber 42 defined between the piston 26 and the sleeve 28. A piston biasing element 44, shown as a coil spring disposed within the chamber 42, urges the piston 26 against the eccentric 24. As the eccentric 24 rotates, the piston 26 reciprocates in the sleeve 28. The volume of the chamber 42 is compressed as the piston 26 is driven by the eccentric 24 towards the sleeve end 28b, thus pressurizing the admitted fluid.

The pressurized fluid exits the chamber 42 through an outlet valve, shown generally at 46. The outlet valve 46 includes an outlet ball 48 that is biased against an outlet port 50 formed through the sleeve end 28b. An outlet spring 52, extending between an end cap 54 and the outlet ball 48, biases the outlet ball 48 against the outlet port 50. In the embodiment of FIG. 3, the outlet spring 52 is illustrated as a generally flat diaphragm spring that is disposed within a spring recess 56 formed in the end cap 54. The outlet spring 52 may alternatively be a Belleville washer having a tapered profile (i.e. concave or convex) which may be oriented having the projecting center area pointing toward the inlet valve 32 or toward the end cap 54. When employing a Belleville washer spring or a diaphragm spring, a center hole may provide a stabilizing and locating function to the outlet ball 48. In other embodiments, the outlet spring 52 may also be any spring, such as, for example, a compression coil spring, a volute spring, or a torsion spring and contact lever assembly. The diaphragm outlet spring 52, for example, reduces the overall pump packaging height, thus permitting easier design implementation in space-restricted environments. Additionally, certain noise, vibration, harshness (NVH) benefits are realized because the flat spring provides improved control of displacement of the outlet valve 46 and improved control of valve actuation speed. The pressurized fluid compresses the outlet spring 52 and permits the pressurized fluid to exit through the outlet port 50 and on to the other portions of the brake system 10.

Figure 4:
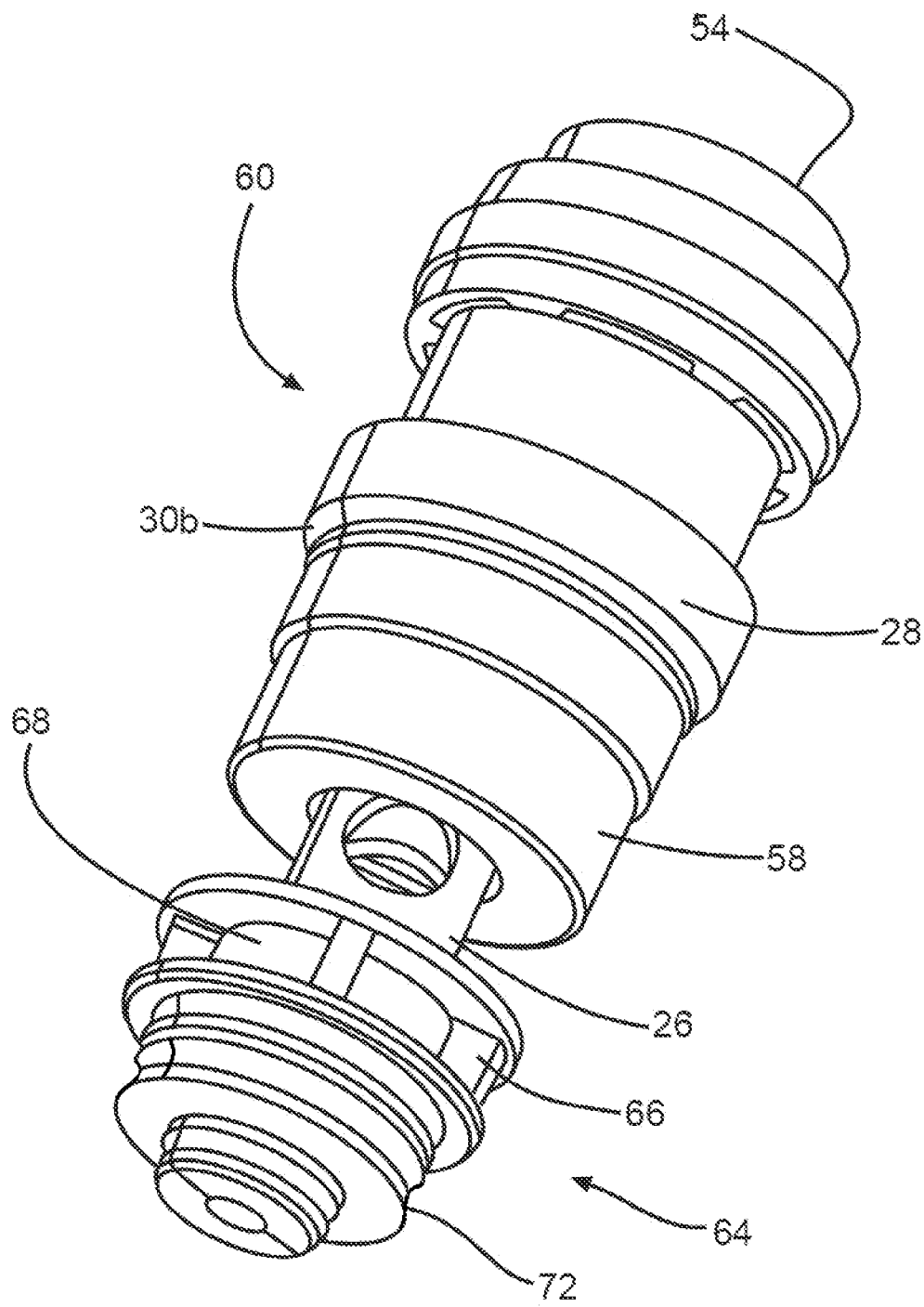
FIG. 4 is an enlarged perspective view of a pump cartridge of the hydraulic pump illustrated in FIGS. 2 and 3.
Figure 5:
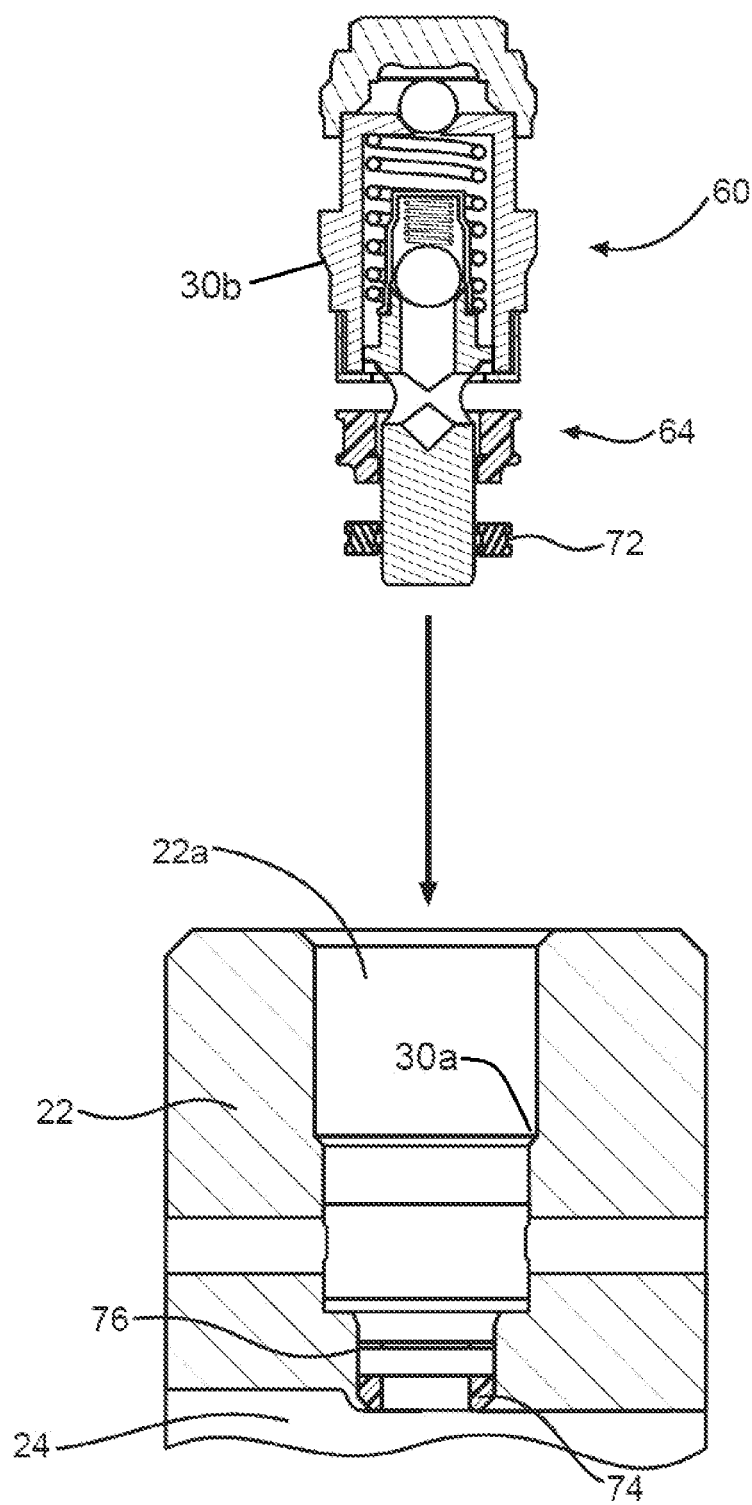
FIG. 5 is an exploded perspective view of a portion of the hydraulic pump illustrated in FIGS. 2 and 3.

The piston 26, sleeve 28, piston biasing spring 44, inlet and outlet valves 32 and 46, respectively, end cap 54, and a retainer 58, illustrated as a retaining collar, are assembled together to form a pump cartridge 60, as shown in FIGS. 3, 4, and 5. The retainer 58 includes a piston aperture 58a which is sized to permit a follower portion 26a of the piston 26 to extend therethrough and contact the eccentric 24, yet prevent a stop collar 26b provided on the piston 26 from passing through. The stop collar 26b also provides support for a high pressure seal 62. In the illustrated embodiment of FIG. 3, the high pressure seal 62 reciprocates with the piston 26 and seals against the inner surface of the sleeve 28, but such is not required. Alternatively, the high pressure seal 62 may move relative to a sealing surface of the piston 26.

The retainer 58 may be formed from a first material that is any suitable material, such as metal or plastic, that provides sufficient structural integrity to resist being fractured or dislodged by way of the force from the piston biasing member 44. The material may also be a reinforced material, such as a fiber-reinforced plastic material. As shown in FIG. 3, the retainer 58 may be configured with a snap-fit projection 58b that locates within a corresponding groove 28a formed on the sleeve 28. The snap-fit projection 58b may be a complete annular ring or several discrete projections formed around the inner surface of the retainer 58. Alternatively, the groove may be formed in the retainer 58 and the projection may extend from the sleeve 28 if desired. In another embodiment, the retainer 58 has a generally smooth inner surface and is attached to the sleeve 28 by a press fit or interference fit. In an embodiment where the retainer 58 is formed from metal, the retainer 58 may be a slip fit over the sleeve. When the retainer 58 is assembled onto the sleeve, a projection (not shown) may be formed, such as by rolling, into the groove 28a. Alternatively, the retainer 58 may be bonded, welded, or otherwise fixed to the sleeve 28.

Referring to FIGS. 3 and 4, a filter assembly, shown generally at 64, includes a filter frame 66 and a filter screen 68. The filter frame 66 includes a piston aperture 70 to permit the follower portion 26a of the piston 26 to extend through and contact the eccentric 24. In one embodiment, the piston aperture 70 may be sized to provide an alignment or alignment and friction reducing function, similar to a bushing, to stabilize the follower portion 26a of the piston 26 during reciprocating motion. As such, the filter frame 66, including the surface of the piston aperture 70, may be made from a second material, different from the first material of the retainer 58, that is suited for sliding contact. Such materials may be, for example, PTFE impregnated plastics or dry-film lubricant coated metals. The surface of the piston aperture 70 may be formed from a different material (i.e., a third material) from the filter frame 66, which may be a lubricated material where the filter frame material is un-lubricated. The piston aperture 70 may be a slip fit with the outer diameter of the follower portion 26a or a line-to-line contacting fit. Alternatively, the piston aperture 70 may include a limited area of contact with the follower portion. For example, the piston aperture 70 may have one or more raised circumferential portions or two or more axial portions, that may contact the follower portion 26a of the piston 26 or may provide a slight interference fit relative to the follower portion 26a.

The filter screen 68 of the filter assembly 64 may be a perforated or meshed section (or multiple sections) formed from the same material as the filter frame 66. Alternatively, the filter screen 68 may be formed from a different material, such as a wire mesh, that is mounted to or formed integrally with (i.e., molded to) the filter frame 66. By providing different materials for the filter frame 66 (and/or the piston aperture surface and filter screen 68) and the retainer 58, each element may be optimized to provide enhanced performance for the respective specific functionality required. Additionally, the assembly processes used to form the HCU pump 20 may be optimized for the materials so that product costs are reduced.

The follower portion 26a of the piston 26 is shown extending through the retainer 58. A seal 72, illustrated as a quad-seal or square cross-sectioned "o-ring," is disposed between the follower portion 26a of the piston 26 and a surface of the cylinder bore 22a. The seal 72, however, may be any type of seal such as, for example, a conventional "o-ring" or a lip seal. As shown in FIGS. 4 and 5, the seal 72 also serves to retain the filter assembly 64 on the follower portion 26a of the piston 26 during the assembly process. A glide ring 74, as shown in FIG. 5, is disposed near the intersection of the cylinder bore and the eccentric bore. The glide ring 74 acts as a bushing to affirmatively position the end of the follower portion relative to the cylinder bore 22a. The glide ring 74 may formed from any material having a suitable low friction characteristic, such as, for example a PTFE impregnated polymer bearing material. Disposed between the glide ring 74 and the seal 72 is a backing ring 76. The backing ring 76 is not required, but serves to maintain the shape and position of the seal 72 during reciprocation of the piston 26.

As shown in FIG. 5, the pump cartridge 60 may be a preassembled component that is ready for assembly into the housing 22. The filter assembly 64 is inserted over the follower portion 26a of the piston 26, and the seal 72 is placed on the follower portion 26a to retain the filter assembly 64. The glide ring 74 is inserted into the cylinder bore 22a and, in one embodiment, is pressed into the cylinder bore near the intersection with the eccentric bore. The backing ring 76 is then placed into the cylinder bore 22a over the glide ring 74. The pump cartridge 60, filter assembly 64, and seal 72 are then inserted into the cylinder bore 22a as a sub-assembly. As the sub-assembly is inserted into the cylinder bore 22a, the filter assembly 64 seats against a portion of the cylinder bore to provide a fluid tight seal interface. As shown in FIG. 3, a portion of the filter frame 66, shown as a radially extending flange, seats against a radially, inwardly-extending portion of the cylinder bore 22a. It should be understood that the seating of the filter assembly 64 in the cylinder bore 22a may be accomplished by any geometric arrangement, such as, for example, a cylindrical press fit or a tapered seating surface.

As the pump cartridge 60 is inserted into cylinder bore 22a, the filter assembly 64 seats against the cylinder bore before contacting the retainer 58. The retainer 58 is configured to move relative to the sleeve 28 so that the filter assembly 64 is positively seated and the sleeve 28 can seat against the sleeve seat 30 in a cartridge home position. The follower portion 26a is inserted through the backing ring 76 and the glide ring 74. The eccentric 24 may be installed either prior to this assembly sequence or afterward.

In an alternative assembly method, the pump cartridge 60 is preassembled with the filter assembly 64 inserted over the follower portion 26a of the piston 26, and the seal 72 is placed on the follower portion 26a to retain the filter assembly 64. The backing ring 76 is then inserted over the follower portion 26a. The backing ring 76 may be positioned directly against the seal 72 or may be spaced apart therefrom. The backing ring 76 engages the outer surface of the follower portion 26a of the piston 26 in a slight press fit, or line to line fit, which permits the backing ring to become part of the pump cartridge 60 prior to assembly into the cylinder bore 22a of the housing 22. In another variation of the assembly method, the backing ring 76 may have a slip fit relationship with the follower portion 26a. The backing ring 76 is disposed between the seal 72 and the filter assembly 64.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A cartridge for use in a pump comprising:
a sleeve having a bore;
a piston having a first portion that is disposed within the bore of the sleeve and a second portion that extends from the first portion outwardly from the sleeve, the second portion of the piston adapted to engage an eccentric for reciprocating the first portion of the piston relative to the sleeve in response to rotation of the eccentric;
a retainer having a first end that engages the sleeve and maintains the first portion of the piston within the bore of the sleeve and a second end that defines a retainer end face including a piston aperture;
a filter assembly having an end distal to the retainer that includes an aperture through which the second portion of the piston extends and an end proximal to the retainer that defines a filter end face, the filter assembly being a separately formed element from the retainer where the retainer end face is axially opposed to and moveable relative to the filter end face; and
a seal that retains the filter assembly on the second portion of the piston.

2. The cartridge of claim 1 wherein the retainer is formed from a first material and the filter assembly is formed from a second material that is different from the first material.

3. The cartridge of claim 2 wherein the filter assembly includes a filter frame and a filter screen, the filter frame being formed from the second material and the filter screen is formed from a third material that is different from the second material.

4. The cartridge of claim 1 wherein the retainer includes an attachment projection that cooperates with a groove formed on the sleeve to form a snap-fit connection therebetween.

5. The cartridge of claim 1 wherein the retainer includes a generally smooth inner surface that is retained onto the sleeve by an interference fit.

6. A pump comprising:
a housing having a cylinder bore;
an eccentric supported by the housing; and
a cartridge configured to be assembled into the cylinder bore, the cartridge comprising:
a sleeve having a bore;
a piston having a first portion disposed within the bore of the sleeve and a second portion extending from the first portion, the second portion of the piston extending outwardly from the sleeve and engaging the eccentric such that the first portion of the piston is reciprocated relative to the sleeve in response to rotation of the eccentric;
a retainer having a first end that engages the sleeve and maintains the first portion of the piston within the bore of the sleeve and a second end that defines a retainer end face including a piston aperture;
a filter assembly having an end distal to the retainer that includes an aperture through which the second portion of the piston extends and an end proximal to the retainer that defines a filter end face, the filter assembly being a separately formed element from the retainer where the retainer end face is axially opposed to and moveable relative to the filter end face; and
a seal that retains the filter assembly on the second portion of the piston.

7. The pump of claim 6 wherein the retainer is formed from a first material and the filter assembly is formed from a second material that is different from the first material.

8. The pump of claim 7 wherein the filter assembly includes a filter screen, and wherein the filter frame is formed from the second material and the filter screen is formed from a third material that is different from the second material.

9. The pump of claim 6 wherein the retainer includes an attachment projection that cooperates with a groove formed on the sleeve to form a snap-fit connection therebetween.

10. The pump of claim 6 wherein the retainer includes a generally smooth inner surface that is retained onto the sleeve by an interference fit.

11. A method of assembling a cartridge of a pump configured for use in a vehicular hydraulic braking system comprising the steps of:
a. inserting a piston having a first portion and a second portion into a sleeve having a bore such that the first portion is positioned within the sleeve bore and the second portion of the piston extends outwardly from the sleeve;
b. engaging a retainer onto the sleeve such that the first portion of the piston is retained within the sleeve bore by the retainer;
c. inserting a separately formed filter assembly having an aperture over the piston second portion after engaging the retainer to the sleeve outer surface such that the second portion of the piston extends through the filter assembly aperture and where opposed faces of the retainer and filter assembly are moveable relative to each other; and d. inserting a seal over the second portion of the piston such that the seal retains the filter assembly on the second portion of the piston.

12. The method of claim 11 further including a step e. of inserting the cartridge into a cylinder bore of a pump housing.

13. The method of claim 12 wherein step e. includes inserting a glide ring into the cylinder bore prior to inserting the cartridge.

14. The method of claim 13 wherein step e. includes inserting a backing ring after inserting after inserting the glide ring and before inserting the cartridge.

15. The method of claim 11 wherein step b. includes engaging a snap fit protrusion extending from the retainer into a groove provided on the sleeve outer surface and step c. includes assembling the filter assembly to the piston second portion in a clearance fit relationship.

* * * * *